Feb. 2, 1960  M. ARCHAMBAULT ET AL  2,923,600
METHOD OF PRODUCING LITHIUM SULPHATE FROM BETA SPODUMENE
Filed Sept. 7, 1956

Inventors
Maurice Archambault
James U. MacEwan
Charles A. Olivier
By Alan Swabey
Attorneys

United States Patent Office 2,923,600
Patented Feb. 2, 1960

2,923,600

METHOD OF PRODUCING LITHIUM SULPHATE FROM BETA SPODUMENE

Maurice Archambault, Quebec City, Quebec, James U. MacEwan, Montreal, Quebec, and Charles A. Olivier, St. Nicholas Station, Quebec, Canada, assignors to Department of Mines, Province of Quebec, a department of the Provincial Government of Quebec, Quebec, Canada Application September 7, 1956, Serial No. 608,560

9 Claims. (Cl. 23—121)

This invention relates to the treatment of lithium-bearing minerals in the form of ores, concentrates or by-products for their conversion to yield water-soluble lithium salts that can be recovered in marketable form.

Lithium salts normally are derived from lithium-bearing minerals as follows. Concentrates of ores of sodumene are heated to above the transformation temperature, generally in practice above 1000° C. but below the melting points of the minerals to convert alpha spodumene to the beta form which is readily attacked by sulphuric acid. Commercial sulphuric acid is used to decompose the beta spodumene. Then, the charge is leached with added water to separate the soluble salts, for example, lithium sulphate. The sulphate may then be converted, by known means, to other salts, for example, the carbonate.

Another method is to decompose the spodumene by heating it along with limestone. The resulting decomposition product is then leached with dilute acid and the salts derived in a known manner.

The problems involved are further discussed in United States Patent 2,516,109, July 25, 1950.

The main disadvantage of the prior art processes referred to is in their expense. This results mainly from the cost of the treating agents and of the fuel for heating.

APPLICANTS' DEVELOPMENT

The present invention makes it possible to decompose beta spodumene using gaseous reactants only in contact with the dry solid charge, at relatively low temperatures.

The applicants' invention is embodied in a process which comprises treating a primary lithium-bearing material, preferably spodumene, with an externally formed catalytically activated gaseous mixture of oxides of sulphur, an oxygen-containing gas, preferably air, and water vapor at a temperature within the range from about 125° C. to about 600° C., preferably within the range from about 225° C. to about 425° C. This procedure results in the conversion of the lithium-bearing material to form water-soluble lithium salts. The applicants have found that under certain conditions almost quantitative extraction of lithium oxide may be obtained.

In accordance with the invention, sulphur dioxide, air and water vapor are first passed over a low temperature catalyst at a temperature within the range from about 425° C. to about 600° C. This has an enhancing effect on the yield. Suitable catalysts are those which are effective to convert sulphur dioxide to sulphur trioxide and can be used within the range of temperature stated, for example, platinized asbestos, iron oxide, vanadium oxide, or nitrogen oxides, for example, generated by introducing vapors of nitric acid together with the mixture of sulphur dioxide and oxygen-containing gas.

The invention has been generally described and it will now be referred to in more detail in the following detailed description including examples which refers in part to the accompanying drawings in which.

Example I 100 parts of a spodumene concentrate, previously decrepitated, of good grade (analyzing 6.35 percent lithium oxide $Li_2O$)) were treated in a static bed in an electrically heated furnace for 1 hour with a mixture of 855 parts of sulphur dioxide (scrubbed in water) and 775 parts of air. The mixture of gases were passed over platinized asbestos at 450° C. as catalyst; the temperature in the reaction zone was 350° C.

After cooling, the recovery of water soluble lithium salts was 99.7 percent.

Figure 1:
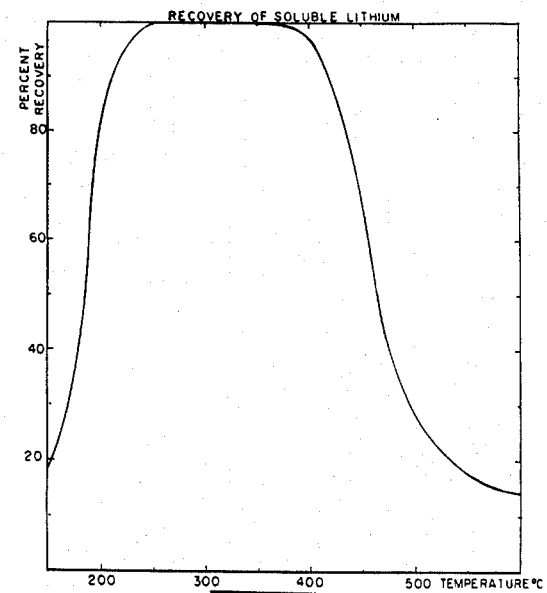
Figure 1 is a graph showing the effect of temperature on recovery, time and other factors remaining constant.

Reference is now made to Figure 1. This figure is based on data assembled from runs similar to that described above in this example. The material tested was beta spodumene concentrate as in that example. The catalyst was platinized asbestos. The gases employed were sulphur dioxide (25 cubic centimeters per minute) bubbled through water and air (50 cubic centimeters per minute). The time of the run was 1 hour in each case. The graph represents the recovery of soluble lithium at various temperatures. It is to be noted that at temperatures approaching 200° C. there is a quick rise in recovery to complete recovery at about 250° C. Then starting at about 350° C. and increasing rapidly to 400° C. there is a quick fall off of recovery particularly between 400° C. and 425° C.

Example II 100 parts of a similar spodumene concentrate were treated in a static bed in an electrically heated furnace for 10 minutes with a mixture of 142 parts of sulphur dioxide (scrubbed in water) and 129 parts of air. The mixture of gases were passed over platinized asbestos at 450° C. as catalyst; the temperature in the reaction zone was 350° C.

After cooling, the recovery of water-soluble lithium salts was 74.2 percent.

Figure 2:
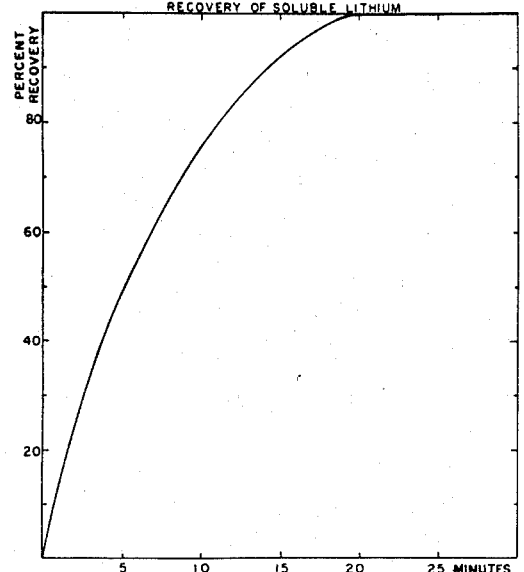
Figure 2 is a graph showing the effect of time on recovery, temperature and other factors remaining constant.

Reference will now be made to Figure 2. The figure is based on data assembled from runs according to this example. The material tested was beta spodumene concentrate. The catalyst was platinized asbestos. The gases used were sulphur dioxide (25 cubic centimeters per minute) bubbled through water and air (50 cubic centimeters per minute). The temperature of the reaction chamber was maintained constant at about 350° C. The conditions were otherwise similar to those of Example 1.

The percent recovery is plotted on the graph against time in minutes. It will be noted that maximum recovery is achieved in times as low as 20 minutes but below this the recovery falls off rapidly.

Example III 400 parts of a decrepitated spodumene ore analysing 1.4 percent lithium oxide ($Li_2O$) were treated in a platinum boat in an electrically heated furnace for 1 hour with a gas mixture of 855 parts of sulphur dioxide (scrubbed in water) and 755 parts of air. The mixture of gases was not passed as usual over platinized asbestos at 450° C. as catalyst. The temperature in the reaction zone was 350° C.

After cooling the recovery of water-soluble lithium oxide was 91.0 percent.

Example IV 100 parts of a beta-spodumene concentrate, analysing 6.4 percent of $Li_2O$ were treated in a stationary bed for twenty (20) minutes with a mixture of 170 parts of sulphur dioxide, bubbled through water and 775 parts of air. The mixture of gases was passed over platinized asbestos at 450° C., as catalyst; the temperature in the reaction zone was 350° C.

After cooling, the recovery of water-soluble lithium salt was over 99.7 percent.

DETAILED DESCRIPTION OF VARIABLE FACTORS

Starting materials

Normally the spodumene ore is crushed to minus 35 mesh and concentrated by flotation. This concentrate is alpha spodumene and normally will contain from 5.5 to 7.5 percent $Li_2O$. This is converted to the beta modification by heating to above 860° C. to cause this conversion or as it is commonly called decrepitation. This operation can be carried out in any suitable furnace such as a muffle furnace, kiln or fluidized bed reactor. With kilns and fluidized bed reactors an adequate dust recovery unit must be included to recover the fine particles carried out of the furnace by the gas stream. Differential thermal analysis and X-ray studies have shown us that it is not necessary to heat the spodumene to above 1000° C. according to usual practice. For example, minus 35 mesh spodumene concentrates are converted to the beta form in a short time after being brought to a temperature above 860 degrees centigrade. No particular benefit is derived through heating the material throughout, above 925 degrees centigrade. A period of thirty minutes at this temperature is usually adequate to convert the coarser particles and a much shorter time for the finer particles.

Quantities

In accordance with the present invention it is recommended that the maximum ratio of sulphur dioxide to free oxygen be about 2 to 1 by volume. Theoretically, 1 mol of spodumene (372 grams), 1 mol of water (18 grams) and 1 mol of sulphur dioxide (64 grams). In practice the amount of oxides of sulfur needed do not exceed the stoichiometric proportions by more than 200 percent.

Operative ranges of quantities are between about 17 percent and about 35 percent by weight of sulphur dioxide on the dry spodumene, from about 8 percent to about 18 percent of oxygen calculated as free oxygen, and from about 1 percent to about 10 percent by dry weight on the spodumene of water. Preferably the water concentration is from about 4 to about 10 percent by dry weight on the spodumene.

The water may be added before or after the catalyst and may be in the form of combined or free $H_2O$ and may be contained in a substance (including the spodumene and reaction products thereof) which will decompose and give off water at the site of the reaction.

Time temperature

Temperatures may range from about 125° C. to about 600° C. The preferred temperature range is between about 275° C. and about 375° C. but may vary up to about 50° C. either way giving a range from about 225° C. to about 425° C., without reducing the yield below good commercial levels.

The temperatures given are as in the reaction zone, that is closely adjoining the reacting solid.

The time of treatment may range from about 5 minutes to about 1 hour. However, the applicants have found that the preferred time is relatively short for example, between about 20 minutes and about 40 minutes. The finer the material and the better the agitation the shorter the contact time required.

Technology of the process

According to one of its preferred aspects, the process consists in conducting the hot gases with or without cleaning from pyrite kilns of the usual type, mixed with a suitable quantity of water vapor, (1) Through catalytic chambers of conventional type, then (2) Through convenient kilns or reactors charged with decrepitated spodumene ores or concentrates.

The travel of the hot gases from the catalytic chambers is arranged in such manner that the gaseous reactants contact the beta-spodumene in a counter-current manner by which the material which has been exposed to the gases for the longest time meets strong fresh gases, while the nearly exhausted gases are brought into contact with fresh beta-spodumene. In this way, on the one hand, the spodumene is completely converted into sulfate and, on the other hand, the pyrite kiln gases and water vapor are nearly fully utilized. This reaction will be enhanced if the gases are under a positive pressure of one half to three atmospheres.

The products of the above gaseous treatment are leached with water to dissolve the lithium sulfates.

The leaching will be done on a counter-current basis in tanks or agitators with the solution richest in dissolved lithium salts being brought in contact with unleached material. The solution from this step will be withdrawn from the circuit and processed by known means for lithium salts recovery.

The solid material from this first leaching will be further leached by a series of aqueous solutions of decreasing lithium content until the lithium salts are dissolved to the economic limit and then the solids water washed. These various solutions, as they become richer in lithium will be used to leach solids of higher lithium contents, as is practiced in counter-current leaching.

Reactions involved

The reaction involved is believed to proceed as follows. The spodumene (which is really lithium alumino and silicate) is broken down to water soluble salts of lithium and an insoluble residue.

The chemical composition of this residue coincides with that of pyrophyllite $(H_2O.Al_2O_3.4SiO_2)$. One can follow the progress of the reaction and determine its completion by noting that the X-ray diffraction pattern of beta-spodumene grows fainter and fainter as the reaction progresses, the end of the reaction being sharply indicated by the complete disappearance of the pattern of beta-spodumene and the appearance of a new pattern, which could not be found by combing the literature.

The reaction that occurs is probably the following:

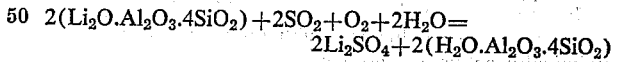
$$2(Li_2O.Al_2O_3.4SiO_2)+2SO_2+O_2+2H_2O=$$
$$2Li_2SO_4+2(H_2O.Al_2O_3.4SiO_2)$$

Other reactions involved are as follows:

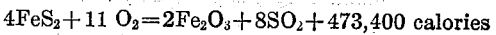
$$4FeS_2+11\ O_2=2Fe_2O_3+8SO_2+473,400\ \text{calories}$$

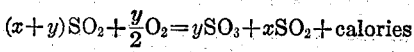
$$(x+y)SO_2+\frac{y}{2}O_2=ySO_3+xSO_2+\text{calories}$$

Source of sulphur dioxide

Liquid sulphur dioxide may be employed. Or, the sulphur dioxide may be generated, for example, by roasting in the presence of air or oxygen, any metal sulphide concentrate (for example, pyrite, pyrrhotite of sphalerite). The roasting reactions (1) Will provide a suitable source of sulphur dioxide for the above reaction;

(2) Will liberate calories which can be used to heat the lithium-bearing minerals and gaseous reactants to the proper range of temperature, thus eliminating or greatly reducing the amount of fuel required for complete treatment.

We claim:

1. A process for producing lithium sulphate comprising passing over solid comminuted beta spodumene a gaseous mixture of sulphur trioxide, air and water vapor in an amount effective to supply at least one mol of $H_2O$ for each mol of spodumene under conditions adapted to maintain the gaseous phase and at a temperature within the range from about 125° C. to about 600° C. thereby to form lithium sulphate and an insoluble residue and separating the lithium sulphate from the residue.

2. A process as defined in claim 1 in which the gaseous reactants are in excess of the spodumene by up to 20%.

3. A process of producing lithium sulphate comprising passing a gaseous mixture of sulphur dioxide, air and water vapor in an amount effective to supply at least one mol of $H_2O$ for each mol of spodumene over a catalyst effective to convert sulphur dioxide to sulphur trioxide, and passing the resulting gaseous mixture into contact with comminuted beta spodumene under conditions to maintain the gaseous phase at a temperature within the range from about 125° C. to about 600° C. thereby to form lithium sulphate and an insoluble residue, and separating the lithium sulphate from the residue.

4. A process as defined in claim 3 in which the sulphur dioxide is present at a ratio to free oxygen of not more than about 2:1 by volume.

5. A process as defined in claim 3 in which the sulphur dioxide is used in an amount between about 17% and about 35% by weight on the dry spodumene and the oxygen from about 8% to about 18% and the water vapor from about 1% to about 10%.

6. A process according to claim 1 in which the temperature is about 350° C.

7. A process according to claim 1, in which the temperature is within the range from about 225° C. to about 425° C.

8. A process according to claim 1, which is carried out under a positive pressure from about ½ to about 3 atmospheres.

9. A process according to claim 1 in which the amount of water vapor present is within the range from about 4 percent to about 10 percent by weight based on the dry weight of the spodumene.

References Cited in the file of this patent

UNITED STATES PATENTS

| | | |
|---|---|---|
| 1,323,464 | Glaeser | Dec. 2, 1919 |
| 1,402,831 | Brown | Jan. 10, 1922 |
| 1,417,831 | Jourdan | May 30, 1922 |
| 1,988,541 | Christensen | Jan. 22, 1935 |
| 2,036,015 | Broderick et al. | May 31, 1936 |
| 2,516,109 | Ellestad et al. | July 25, 1950 |